(12) United States Patent
Lindholm (10) Patent No.: US 7,092,519 B1
(45) Date of Patent: Aug. 15, 2006

(54) COMMUNICATION TERMINAL HAVING EXCHANGEABLE PARTS

(75) Inventor: Christian Lindholm, Helsingfors (FI)

(73) Assignee: Nokia Mobile Phones, Ltd., Espoo (FI)

( * ) Notice: Subject to any disclaimer, the term of this patent is extended or adjusted under 35 U.S.C. 154(b) by 345 days.

(21) Appl. No.: 09/678,962

(22) Filed: Oct. 4, 2000

(30) Foreign Application Priority Data

Oct. 8, 1999 (GB) ................................. 9923927.9

(51) Int. Cl.
*H04M 1/00* (2006.01)
*H04M 9/00* (2006.01)

(52) U.S. Cl. ............... 379/419; 379/433.11; 455/575.1

(58) Field of Classification Search ........... 379/433.11, 379/433.06, 433.07, 368, 396, 419; 455/90, 455/575, 90.3, 575.1; 345/156
See application file for complete search history.

(56) References Cited

U.S. PATENT DOCUMENTS

| | | | |
|---|---|---|---|
| 5,023,936 A | 6/1991 | Szczutkowski et al. | ....... 455/90 |
| 5,077,832 A | 12/1991 | Szczutkowski et al. | ........ 455/89 |
| 5,465,401 A | 11/1995 | Thompson | .................... 455/89 |
| 5,615,257 A * | 3/1997 | Pezzullo et al. | ............ 379/396 |
| 5,848,152 A | 12/1998 | Slipy et al. | ................. 379/433 |
| 6,225,976 B1 * | 5/2001 | Yates et al. | ................. 345/156 |

FOREIGN PATENT DOCUMENTS

| | | |
|---|---|---|
| EP | 0681258 A1 | 11/1995 |
| GB | 2192115 | 12/1987 |
| GB | 2333926 | 8/1999 |
| WO | WO 97/44912 | 11/1997 |

\* cited by examiner

*Primary Examiner*—William J. Deane, Jr.
(74) *Attorney, Agent, or Firm*—Perman & Green, LLP (57) ABSTRACT

A communication terminal has a user interface having a keypad and display means, said key pad is included in a releasable housing part assembly, a processor controlling the terminal in dependence of the operation of the user interface, and identification means included in said housing part assembly for identifying the housing part assembly. The processor controls the display means in dependence of the identified housing part assembly.

19 Claims, 6 Drawing Sheets

COMMUNICATION TERMINAL HAVING EXCHANGEABLE PARTS

TECHNICAL FIELD OF THE INVENTION

The invention relates to a communication terminal having exchangeable parts. Hereby the user is able to replace e.g. one front cover with another front cover having another color or design pattern. The user is therefore able to personalize his phone to give it a distinctive outer appearance.

BACKGROUND OF THE INVENTION

During recent years it has become still more popular to exchange covers of phones in order to change the aesthetic appearance of the phone. Basically this started with the phone sold under the trade name Nokia 2110™. Later on the phone sold under the trade names Nokia 5110™ and Nokia 3210™.

SUMMARY OF THE INVENTION

According to the invention there is provided a communication terminal comprising a user interface having a keypad and display means, said key pad is included in a releasable housing part assembly, a processor controlling the terminal in dependence of the operation of the user interface, identification means included in said housing part assembly for identifying the housing part assembly, said processor controls the display means in dependence of the identified housing part assembly, and the functionality of at least one of the keys of the keypad is displayed in the display, and the processor controls the display of the functionality of said at least one of the keys in dependence of the identification of the front cover. Hereby the communication terminal is able to e.g. change user-interface by detecting a mechanical part connected thereto simply by selecting built-in application/server software.

Preferably this concept is implemented in a cellular phone. By replacing covers on such a phone e.g. different key layouts will become available because the phone according to this aspect of the invention by itself provides the required software for supporting such a change. This will be of high commercial value because phones are sold in many variants due to requirements from the different operators.

According to the invention it becomes possible to change the UI style of a phone—just by exchanging e.g. covers.

According to the preferred embodiment the releasable housing part assembly is an exchangeable front cover for a phone. The identification means includes two first connector parts where one of these is integrated in the exchangeable front cover for the phone while the other connector part is integrated in the main housing of the phone.

In a first embodiment the first connector part has a mechanical interface, preferably a number of biased pins, and said second connector part has means for sensing, e.g. a number of switches for detecting the presence of said pins. Alternatively the phone and the front cover has two mating electronic connectors, through which the controller of the phone may transfer a request message to an identification circuit in the front cover. This identification may be a passive circuit, e.g. an impedance, or an active circuit including it own operating system similar to what is known from SIM cards (Subscriber Identity Module) used in the GSM system.

According to the preferred embodiment, in the keypad area the main housing of the phone may be provided with a plurality of switches. The keypad fitted into the front cover of the phone has pins for cooperating with respective ones of said plurality of switches. When a key is pressed the associated switch is activated, and the controller interprets the switches activated by key pressings in dependence of the identification of the front cover. This means that some switches may be disabled with one keypad and enabled with another. Similar to this the controller controls the text and messages displayed in the display. In this way it becomes possible to change the amount of keys and control the full user interface just by changing the front cover. The key layout known from Nokia 5110 (one soft key, one scroll key and one clear key+twelve alpha numeric keys) may be changed to the key layout known from Nokia 6110 (two soft keys, one scroll key, one on-hook key and one off-hook key+twelve alpha numeric keys) may be operable on the very same main body of a phone.

For a better understanding of the present invention and to understand how the same may be brought into effect reference will now be made by way of example only to the accompanying drawings in which:—

DETAILED DESCRIPTION OF EMBODIMENTS

Figure 1:
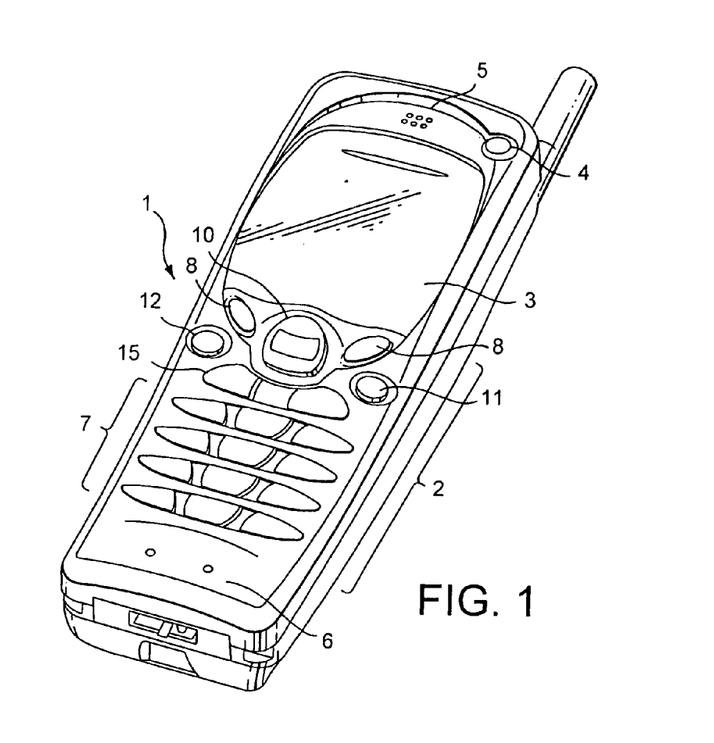
FIG. 1 illustrates a preferred embodiment of a hand portable phone according to the invention.
Figure 3:
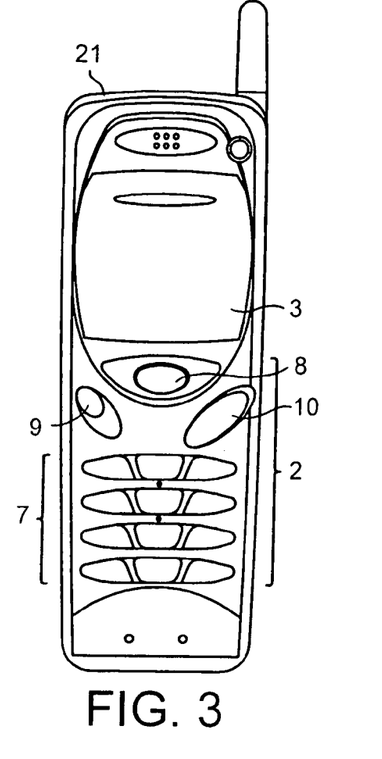
FIG. 3 shows in a front view a first front cover having a first key layout for the phone shown in FIG. 1.

FIG. 1 shows a preferred embodiment of a phone according to the invention, and it will be seen that the phone, which is generally designated by 1, comprises a user interface having a keypad 2, a display 3, an on/off button 4 FIG. 3), a speaker 5 (only openings are shown in FIG. 1), and a microphone 6 (only openings are shown in FIG. 1). The phone 1 according to the preferred embodiment is adapted for communication via a cellular network, but could have been designed for a cordless network as well.

According to the first embodiment shown in FIGS. 1 and 3, the keypad 2 has a first group 7 of keys including twelve alphanumeric keys. In addition to this the keypad 2 has two soft keys 8, a scroll key 10 for navigating the cursor in the display 3, a key 11 for switching between numbers and letters for the twelve alphanumeric keys in the first group 7 of keys, a "clear key" 9 for clearing one or more letters from the display, and two call handling keys 15 for establishing and terminating a call, respectively. The present functionality of the two soft keys 8 are shown in separate fields in the display 3 just above the two soft keys 8. This key layout is characteristic of e.g. the Nokia 2110™ phone and the Nokia 3810™ phone.

Figure 4:
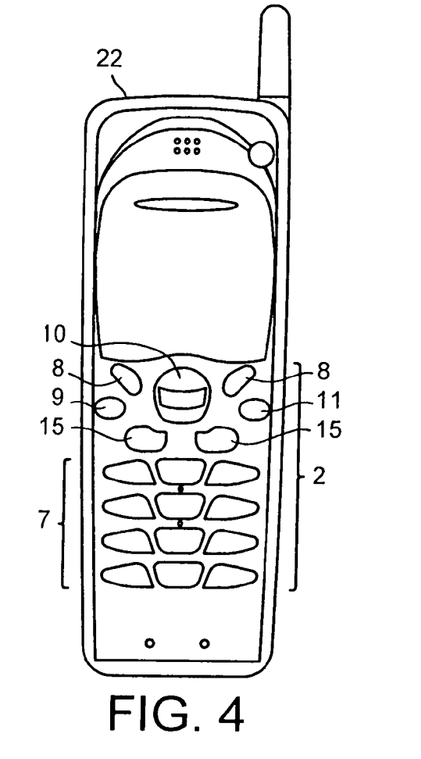
FIG. 4 shows in a front view a second front cover having a second key layout for the phone shown in FIG. 1.

According to the second embodiment shown in FIG. 4, the keypad 2 has a first group 7 of keys including twelve alphanumeric keys. In addition to this the keypad 2 has a single soft key 8, a scroll key 10 for navigating the cursor in the display 3, and a "clear key" 9 for clearing one or more letters from the display 3. In this embodiment the single soft key 8 handles the call handling. The present functionality of the single soft key 8 are shown in a separate field in the display 3 just above the soft key 8. This key layout is characteristic of e.g. the Nokia 3110™ phone, the Nokia 3210™ phone, and the Nokia 5110™ phone.

The phone includes exchangeable front covers 21, 22, whereby the user has the possibility to switch between e.g. the front covers 21 and 22 shown in FIGS. 3 and 4, respectively. This means that the user may select to use his preferred key layout in his phone. The locking mechanism for the exchangeable front covers 21, 22 will not be explained in details, but the solutions used in the Nokia 3210™ phone or the Nokia 5110™ phone will be applicable.

Figure 2:
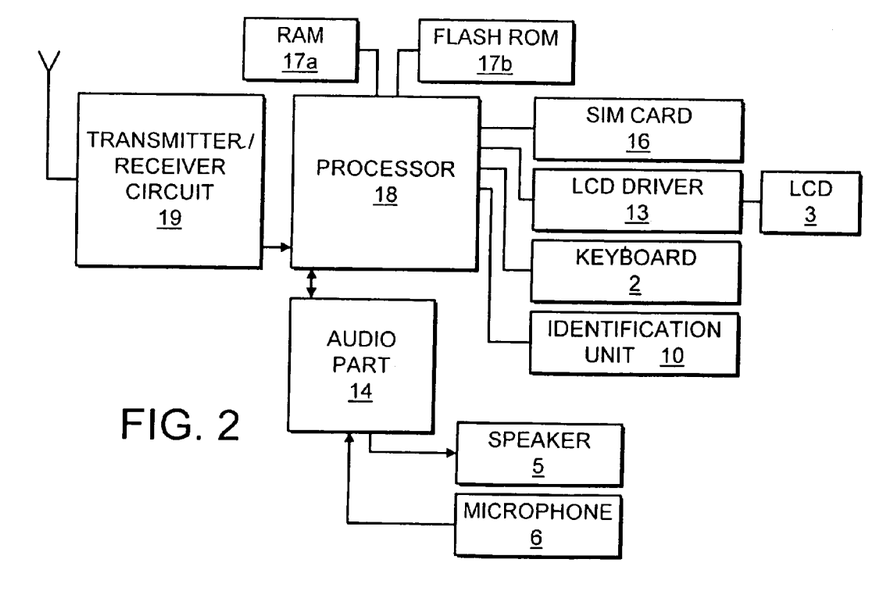
FIG. 2 schematically shows the essential parts of a telephone for communication with a cellular network.

FIG. 2 schematically shows the most important parts of a preferred embodiment of the phone, said parts being essential to the understanding of the invention. The preferred embodiment of the phone of the invention is adapted for use in connection with the GSM 900 MHz and GSM 1800 MHz network, but, of course, the invention may also be applied in connection with other cellular phone networks or cordless networks. A processor 18 controls the communication with the network via a transmitter/receiver circuit 19 and an antenna 20.

The microphone 6 transforms the user's speech into analog signals, and the analog signals formed thereby are AND converted in an A/D converter (not shown) before the speech is encoded in an audio part 14. The encoded speech signal is transferred to the processor 18, which i.a. supports the GSM terminal software. The audio part 14 speech-decodes the signal, which is transferred from the processor 18 to the earpiece 5 via a D/A converter (not shown).

The processor 18 also forms the interface to the peripheral units of the apparatus, including a RAM memory 17a and a Flash ROM memory 17b, a SIM card 16, the display 3 via an LCD driver 13, the keypad 2, and an identification unit 20 (as well as data, power supply, etc.).

Figure 6:
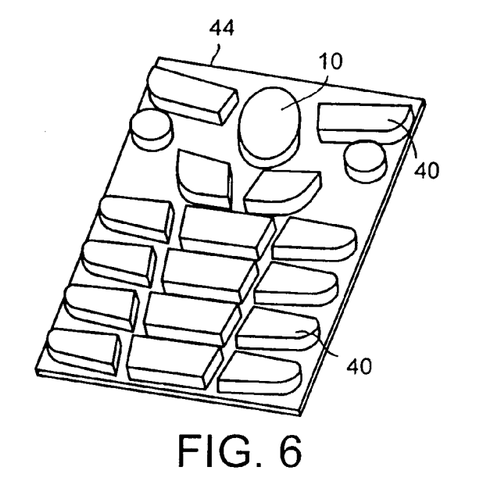
FIG. 6 shows in perspective the second keymat of the phone shown in FIG. 4.
Figure 7:
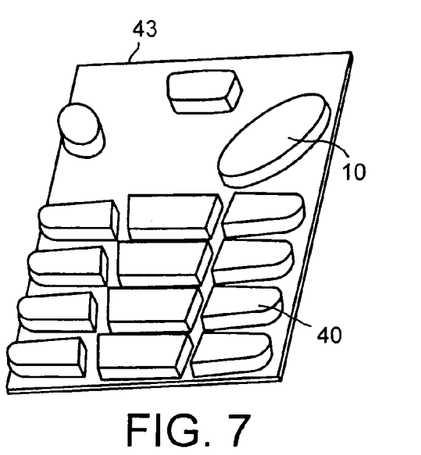
FIG. 7 shows in perspective the first keymat of the phone shown in FIG. 3.
Figure 8:
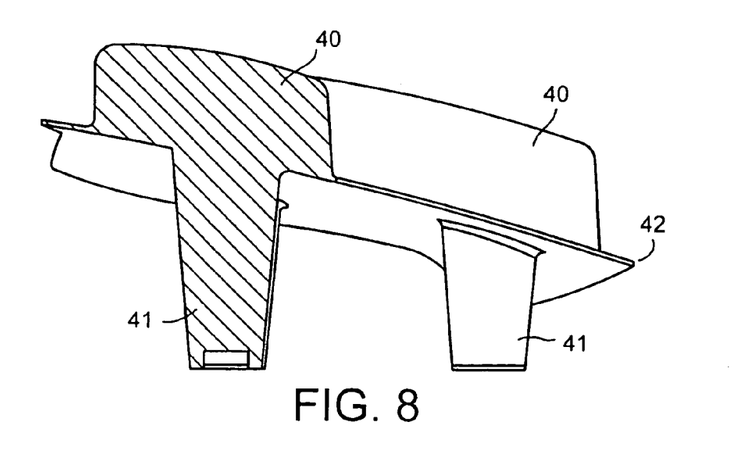
FIG. 8 shows a cross section of a key in one of the keymats shown in FIGS. 6 and 7.

As disclosed in one earlier patent application GB 9903258.3 filed 12 Feb. 1999 by the assignee the keys 40 (see FIGS. 6,7 and 8) in the keymat 43, 44 are formed integrally by deep drawing a plastic foil 42 and filling the cavities with a suitable plastic material in order to provide actuation taps for closing switches on the Printed Circuit Board of the phone when the key is depressed. Each key 40 is provided with one tap 41 and in the preferred embodiment the scroll keys 10 is provided with two taps 41 in order to indicate whether the cursor should be moved upwards or downwards.

Figure 5:
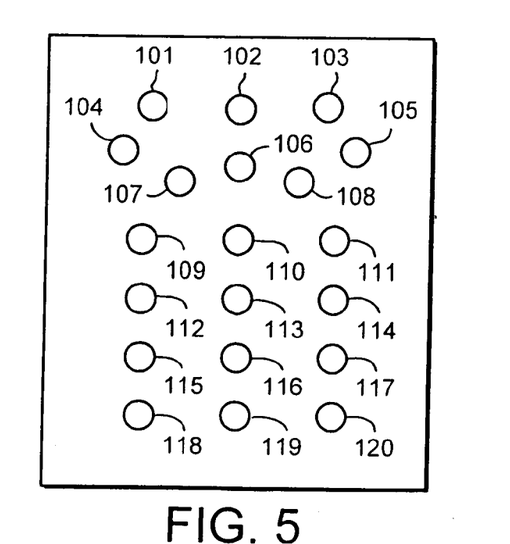
FIG. 5 shows in a front view a switch layout supporting both the first and the second key layout shown in FIGS. 3 and 4, respectively.

The position 101–120 of the switches on the Printed Circuit Board (PCB) is indicated in FIG. 5. The table below illustrates the relation between the position of the switches on the PCB and the functionality of the keys of the phone shown in FIGS. 3 and 4, respectively.

TABLE 1

Relation between position of the switches on the PCB and associated key functionality

| Position No. | Functionality of switch in the FIG. 3 key layout. | Functionality of switch in the FIG. 4 key layout. |
|---|---|---|
| 101 | Disabled | Soft-key/Multi functionality key |
| 102 | Soft-key/Multi functionality key | Scroll up |
| 103 | Disabled | Soft-key/Multi functionality key |
| 104 | Clear key | Clear key |
| 105 | Scroll up | Alphabetic/numeric character switch key |
| 106 | Disabled | Scroll down |
| 107 | Disabled | Call establishment key |
| 108 | Scroll down | Call termination key |
| 109 | "1" | "1" |
| 110 | "2/abc" | "2/abc" |
| 111 | "3/def" | "3/def" |
| 112 | "4/ghi" | "4/ghi" |
| 113 | "5/jkl" | "5/jkl" |
| 114 | "6/mno" | "6/mno" |
| 115 | "7/pqrs" | "7/pqrs" |
| 116 | "8/tuv" | "8/tuv" |
| 117 | "9/wxyz" | "9/wxyz" |
| 118 | "*/+" | "*/+" |
| 119 | "0" | "0" |
| 120 | "#" | "#" |

It is seen from table 1 how a common switch layout (FIG. 5) may serve different key layouts (FIG. 3 and FIG. 4). In order give the processor 18 a possibility to recognize the present key layout determined by releasable housing part assembly, e.g. the exchangeable front cover 21, 22 and the associated key pad 43, 44, it communicates with an identification means, such as the identification unit 20, included in the housing part assembly for identifying the housing part assembly. The processor 18 controls the terminal and the display means in dependence of the identified housing part assembly.

Figure 10:
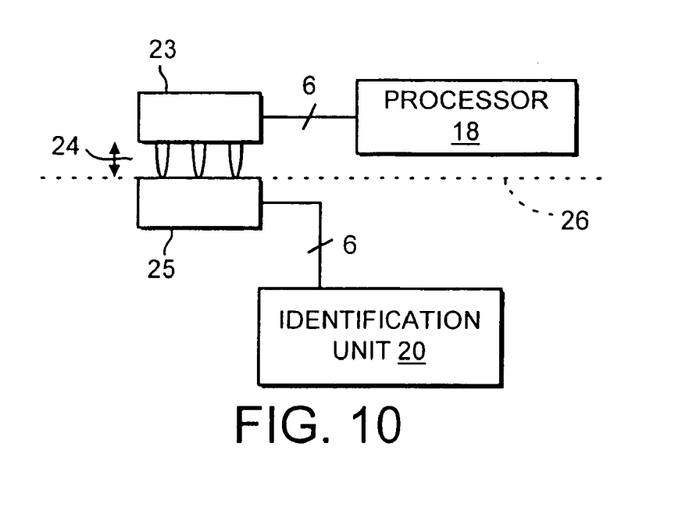
FIG. 10 shows schematically the interface between the identification unit and the processor used in a communication or computing terminal according to the invention.

A preferred embodiment for the interface between the identification unit 20 and the processor 18 is schematically shown in FIG. 10. A connector including two connector part 23 and 25 is provided in the mechanical interface (marked with a dotted line) between the phone and the exchangeable front cover 21, 22. The first connector part 23 in the phone is provided with a number of resilient legs 24 (in the preferred embodiment six legs) for establishing a reliable electrical connection with metallic pads on the second connector part 25 integrated in the exchangeable front cover 21; 22. This kind of connectors are presently used for SIM card connections and a connector from the company Amphenol-Tuchel having the part number C707 10M006 0762 may be used for this purpose. The second connector part 25 has basically a plurality of pads (in the preferred embodiment six pads) being connected to the identification unit 20. When the processor 18 asks the identification unit 20 about the key layout the identification unit 20 responds and the processor interprets the closing of the switches according to this information.

Figure 11:
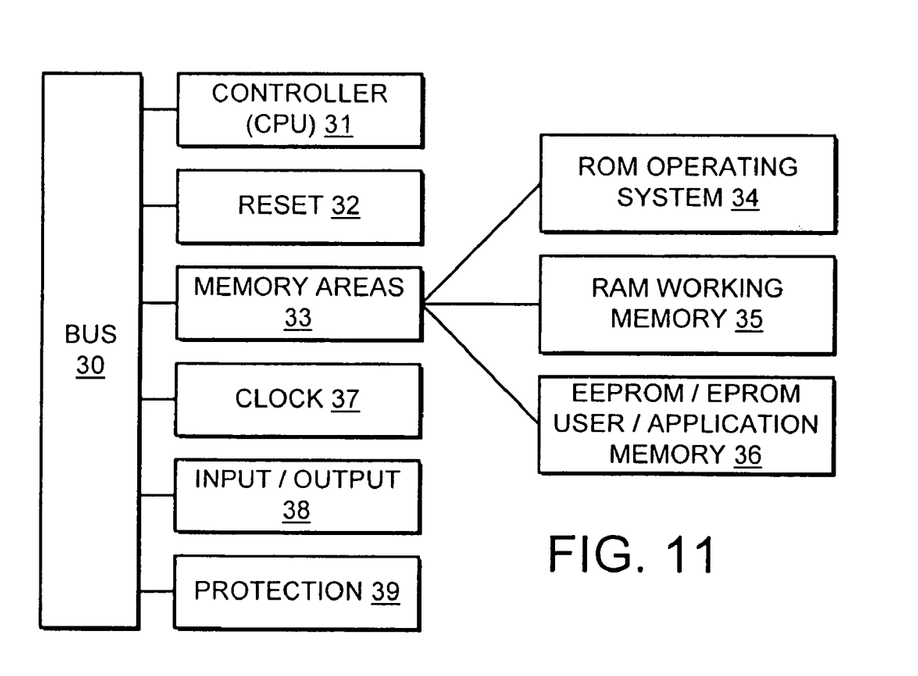
FIG. 11 shows schematically a preferred embodiment of the identification unit used in a communication or computing terminal according to the invention.

A preferred embodiment of the identification unit 20 will be explained with reference to FIG. 11. For this embodiment the identification unit 20 acts as an almost complete computer system communicating with the phone via the connector 23, 25. The core of the identification unit 20 is the controller 31 (a microprocessor usually called CPU). The CPU is able to execute an instruction set that ultimately defines the capabilities of the card. Preferably the instruction set is permanently wired into the memories of the identification unit 20. Higher level functions are permanently stored in the memory, indicating to the CPU what to do, when, and how to do it. These functions could be considered as being the operating system of the identification unit 20. The controller 31 always takes care of the memory management for the memories on the exchangeable front cover 21, 22. Any external (from the phone) access to the card memory or functions is performed through the CPU (controller 31). The operating system of the identification unit 20 is also used to define executable functions eventually stored in the user/application memory 36.

Furthermore the identification unit 20 includes a memory area 33 including memories 34–36, protection circuits 39, a reset circuit 32, a clock 37 and input-output means 38 (including the terminal pads of the connector 25). All these units may communicate via a common bus 30 and the controller 31 may communicate with the processor 18 in the phone 1 via the connector 23, 25.

The user/application memory 36 is protected by the controller 31, which filters the data flow, manages data storage and reading, and runs preprogrammed executable functions. All the information required by the processor 18 is stored in the user/application memory 36. In a preferred embodiment of the invention the communication between the processor and the identification unit 20 is secure based on public key encryption.

Figure 9:
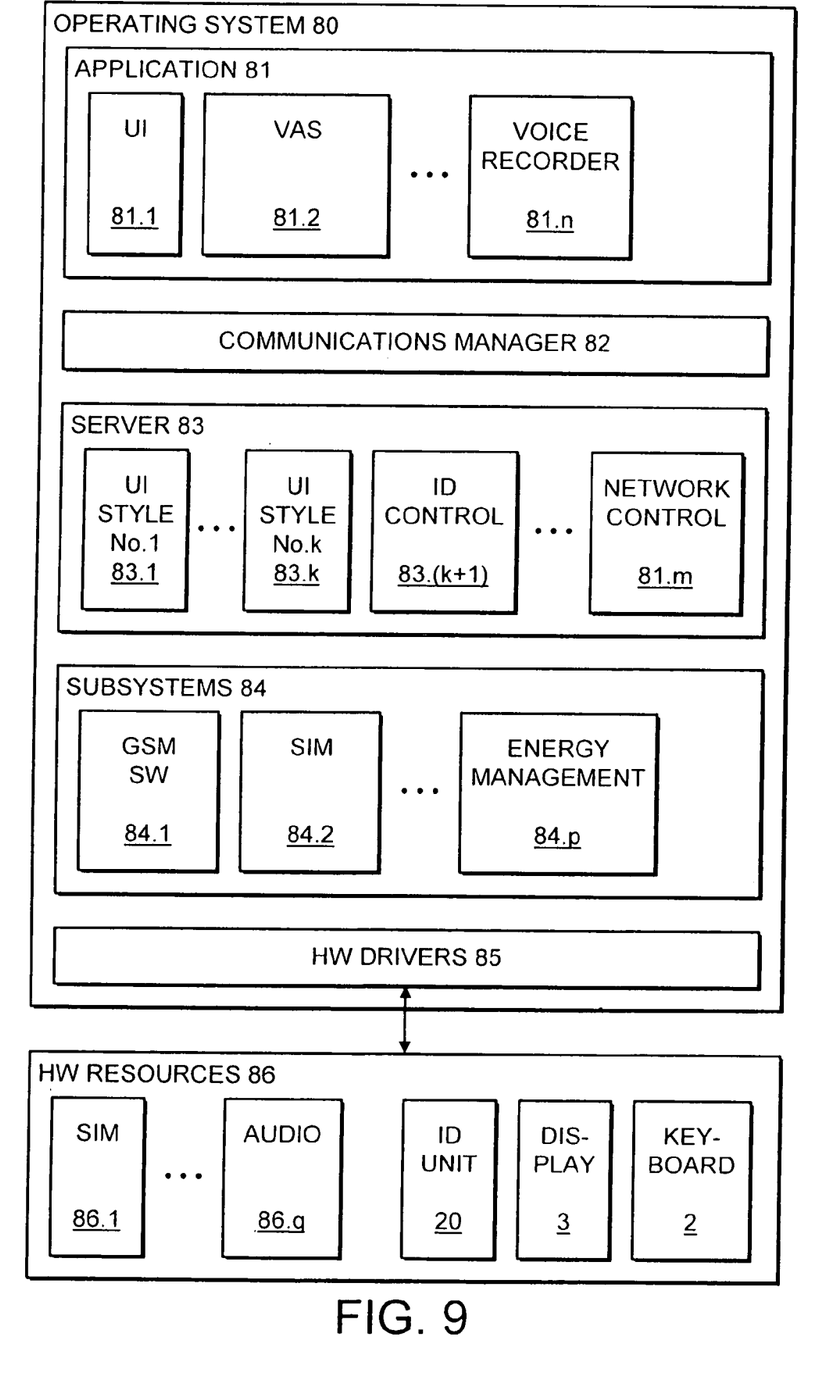
FIG. 9 illustrates the software architecture in a cellular phone according to a preferred embodiment of the invention.

The software architecture shown in FIG. 9 is known as Intelligent Software Architecture (ISA), and the software architecture is used in terminal, e.g. a cellular phone, according to a preferred embodiment of the invention. An Operating System 80 has a Communication Manager 82 controlled by the processor 18. The Communication Manager 82 handles the communication between a number of Applications 81 and a number of Servers 83.

The Applications 81.1–81k and 81.(k+1)–81.n, and the Servers 83.1–83.m communicates under control from the Communication Manager 82. The Applications 81 uses the services from one or more Servers 83 to build features, and to present the features to the user via the UI panels.

A Server 83 controls a resource and provides an interface that allows other entities to access the controlled resource. The Servers 83 controls, e.g. the UI setting, the audio, the ID of the releasable part and the accessed cellular network, but only access the resource when requested via the Communication Manager 82. A server may use services provided by one or more other servers as a part of its own services, but the server does not present information to the user via the UI panels.

A Subsystem 84 is an autonomous part of the MCU SW, with a special service interface to the other Subsystems 84. These Subsystems 84 may include a number of subsystems 84.1–84.p, such as GSM SW 84.1, SIM SW 84.2, and Energy Management 84.p.

The Hardware Drivers 85 are the interface to the Hardware Resources 86 of the phone. According to a preferred embodiment the processor 18 requests ID information from the identification unit 20 via the appropriate driver 89, and when this ID information is received the processor 18 checks the ID by means of ID control server Servers 83.2. When the ID of the releasable part is accepted the UI application 82.1 uses the appropriate UI style server 83.1–83.k for controlling the keyboard and the display in a proper way according to the identified front cover part.

It is essential for the invention that the software for operating the terminal is stored inside the terminal and that the identity unit just informs the processor 18 about the software applications and servers to be used.

Figure 12:
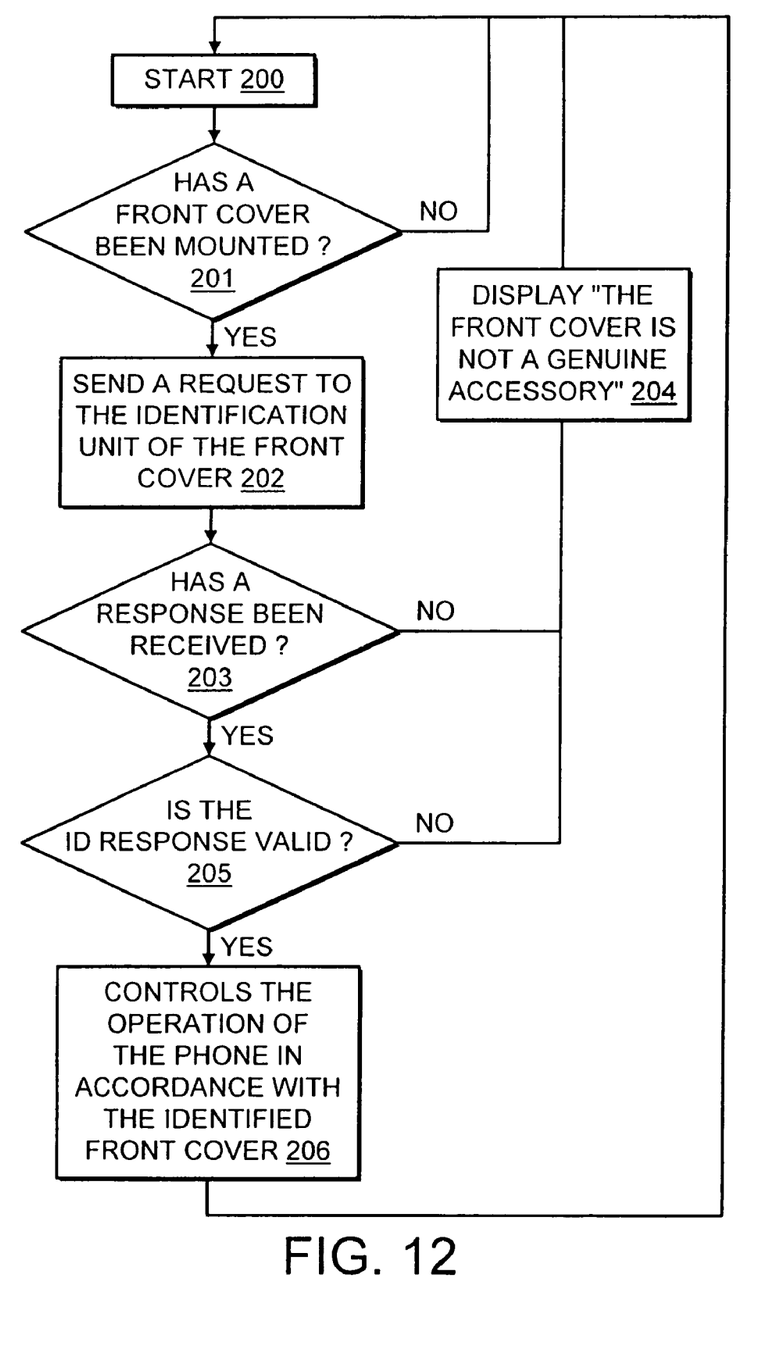
FIG. 12 is a flow chart illustrating the decision process performed by the processor in a preferred embodiment of a communication or computing terminal according to the invention.

When the processor 18 of a phone in step 200 in FIG. 12 detects a possible changed front cover—either by means of not shown microswitch mechanically activated when one of the resilient legs 24 of the terminal part 23 is depressed (or by a periodical check of changed peripherals)—it starts in step 201 to check whether a front cover has been mounted.

In step 201 the processor 18 checks whether a front cover has been mounted on the phone. Basically the check may be done by checking whether the one depressed resilient legs 24 of the terminal part 23 remains depressed when a predetermined period of time (e.g. 2 seconds) has expired. If no front cover is mounted the processor goes back to step 200 and waits for a new indication.

If the checking in step 201 was positive the processor sends a request in step 202 to the identification unit 20 of the front cover and asks the identification unit 20 to identify itself and thereby the front cover. In step 203 the processor checks whether a response has been received within a predetermined period of time. If not, the front cover is deemed not to be a genuine accessory and therefore the processor 18 in step 204 displays an error notice, "the front cover is not a genuine accessory", in the display 3.

If a response is received in step 203, but the ID of the identification unit 20 does not fit with valid ID's stored in a look-up table in the ROM memory 17b, the front cover is deemed not to be a genuine accessory and therefor the processor 18 displays the error notice in step 204 in the display 3. However if the processor 18 recognizes the ID of the identification unit 20 the front cover is deemed to be a genuine front cover then the processor 18 in step 206 controls the phone to act according to this. Then the processor goes back to step 200 and waits for a new indication.

The preferred embodiment is related to a cellular phone having an exchangeable front cover, but the invention generally relates to a method of controlling the operation of a handheld computing terminal. The terminal, e.g. a handheld phone, an organizer, a PDA has a releasable part, and when this part is connected to the handheld computing terminal, the terminal identifies the releasable part by means of a controller integrated in the handheld computing terminal. Then the controller controls the terminal in dependence of the operation of a data input means provided in said handheld computing terminal, and interprets data inputted via said data input means in dependence of the identified releasable part.

The invention has in the preferred embodiment been described together with an intelligent identification unit 20 being able to respond to a request—basically in a handshaking procedure, whereby it is partly verified that a front cover is placed on the phone and that this front cover is a genuine cover. The main idea is to select software in the terminal in dependence of the recognition of the releasable part of the phone.

If the security is not desired as an important feature, the identification unit 20 may be replaced by one or more pins cooperating with microswitches on the terminal in order to identify the replaceable part.

The invention is not limited to the above-described examples or to the drawings showing examples of an embodiment, but can be varied within the scope of the appended claims.

What is claimed is:

1. A communication terminal comprising:
   a main housing including a processor, a display, and a plurality of switches; and
   a user exchangeable cover having a plurality of keys that operate to activate the plurality of switches,
   wherein the processor operates to both change the operations associated with the keys and to define the display according to an identification of the user exchangeable cover, the identification including detecting a possible changed cover and then checking whether the user exchangeable cover has been mounted after a predetermined period of time has expired.

2. The communication terminal of claim 1, wherein the user exchangeable cover includes a communication device for providing identification.

3. The communication terminal of claim 2, wherein the communication device provides identification by activating at least one microswitch in the main housing.

4. The communication terminal of claim 2, wherein the communication device provides identification in response to a request from the processor.

5. The communication terminal of claim 4, wherein the request and identification are encrypted.

6. A communication terminal comprising:
   a processor;
   a display;
   a switch layout; and
   a user exchangeable cover having:
      a plurality of keys in a key layout that operate on the switch layout; and
      an identification unit that identifies software applications and servers to be used by the processor for relating the key layout to the switch layout and for defining the display in response to the processor detecting a possible changed cover and then checking whether the user exchangeable cover has been mounted after a predetermined period of time has expired.

7. The communication terminal of claim 6, wherein the processor, display, and switch layout are included in a main housing.

8. The communication terminal of claim 6, wherein the identification unit identifies the software applications and servers by activating at least one microswitch in the communication device.

9. The communication terminal of claim 6, wherein the identification unit identifies the software applications and servers in response to a request from the processor.

10. The communication terminal of claim 9, wherein the request and identification are encrypted.

11. A method of operating a communication terminal comprising:
    installing a user exchangeable cover having a plurality of keys that activate a plurality of switches on a main body of the communication terminal; and
    changing operations associated with the plurality of keys activating the plurality of switches and defining a display of the communication terminal in accordance with an identification of the user exchangeable cover, the identification including detecting a possible changed cover and then checking whether the user exchangeable cover has been mounted after a predetermined period of time has expired.

12. The method of claim 11, further comprising identifying the user exchangeable cover by activating at least one microswitch in the main body.

13. The method of claim 11, further comprising identifying the user exchangeable cover by exchanging a request from a processor in the main body and a response from a communication device in the user exchangeable cover.

14. The method of claim 13, wherein the request and the response are encrypted.

15. A method of operating a communication terminal comprising:
    installing a user exchangeable cover having a plurality of keys in a key layout that operate on a switch arrangement in the communication terminal;
    detecting a possible changed cover and then checking whether the user exchangeable cover has been mounted after a predetermined period of time has expired, and
    identifying software applications and servers to be used for relating the key layout to the switch arrangement and for defining a display of the communication terminal.

16. The method of claim 15, further comprising activating at least one microswitch on the communication terminal to identify the software applications and servers.

17. The method of claim 15, further comprising exchanging a request and a response with a processor of the communication terminal to identify the software applications and servers.

18. The method of claim 17, wherein the request and response are encrypted.

19. A removable housing cover for a portable radio communication device comprising:
    attachment and detachment means for user attachable and detachable connection of the removable housing cover to the portable radio communication device, wherein in use the removable housing cover is mounted on, and dismounted from, the portable radio communication device by a user by using the attachment and detachment means;
    an identity means associated therewith,
    wherein the portable radio communication device includes a sensor for sensing the identity means of the removable cover and a processor for controlling the operating characteristics of the device,
    wherein the processor operates to detect a possible changed cover and then to check whether the removable housing cover has been mounted after a predetermined period of time has expired, and
    wherein the sensor of the portable radio communication device senses the identity means and outputs a sensed parameter indicative of the identity means to the processor when the removable cover is mounted on the portable radio communication device, and
    wherein the processor is responsive to the sensed parameter so as to change the operating characteristics of the portable radio communication device.

* * * * *